Figure 1:
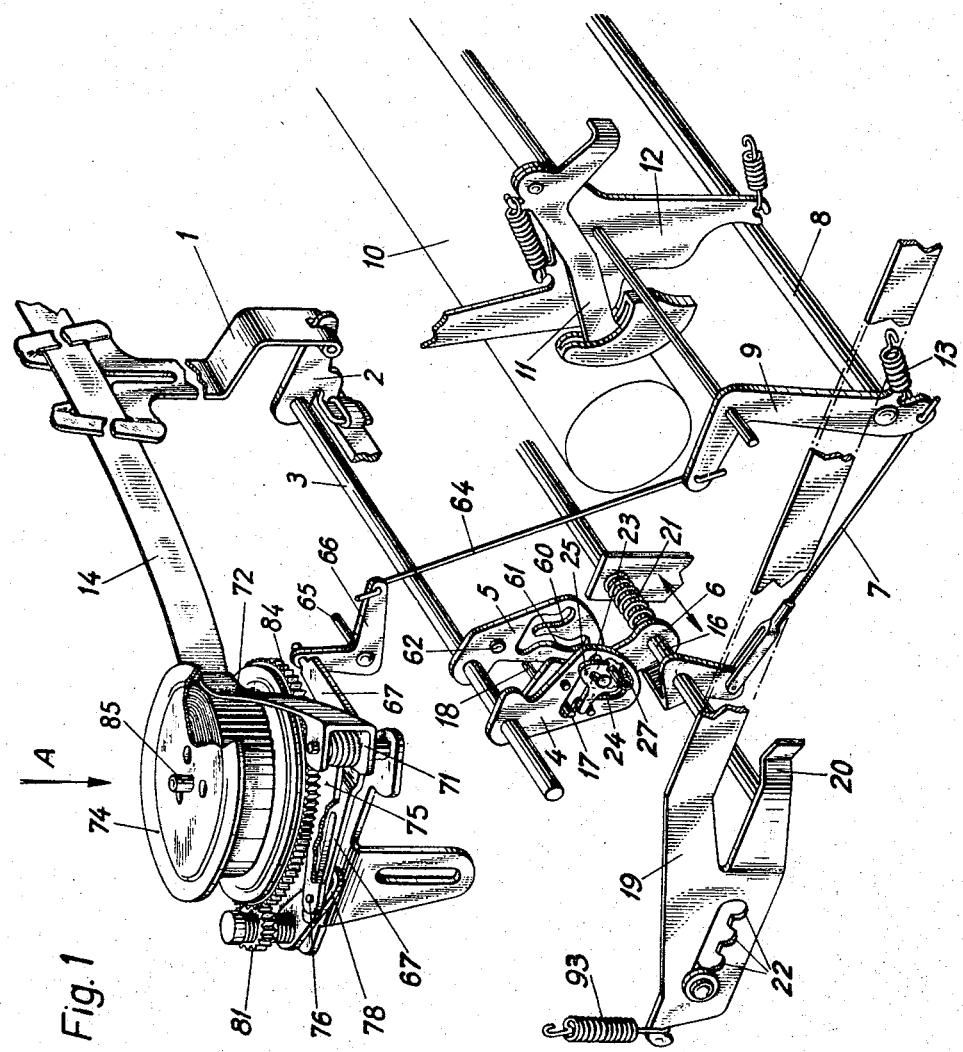

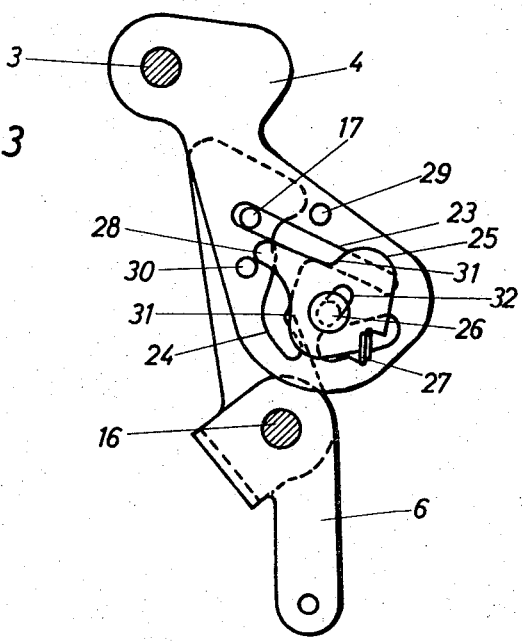
Fig. 3
Fig. 2
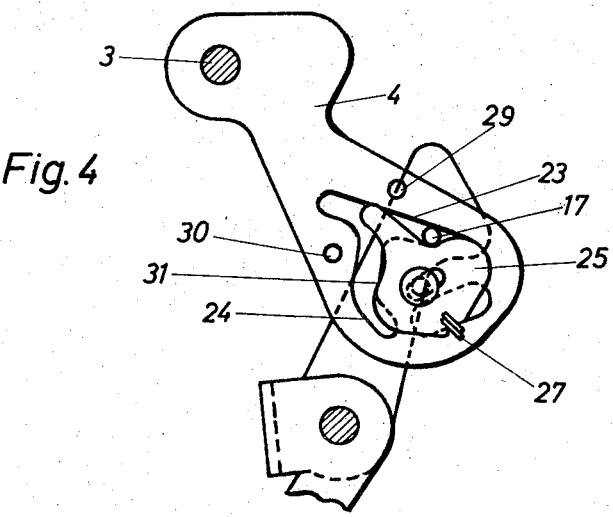
Fig. 4

Oct. 24, 1967  J. MEINHERZ ETAL  3,348,650
RIBBON FEED MECHANISM FOR TYPEWRITERS, COMPUTERS, AND
SIMILAR MACHINES
Filed July 3, 1962  6 Sheets-Sheet 3
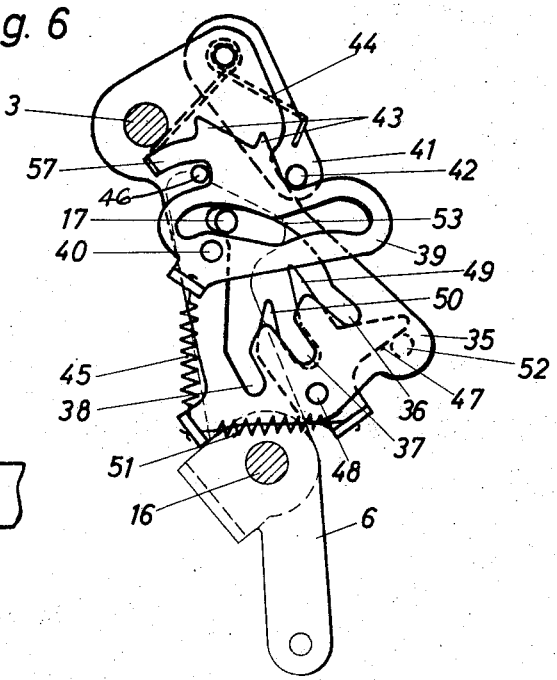
Fig. 6
Fig. 5
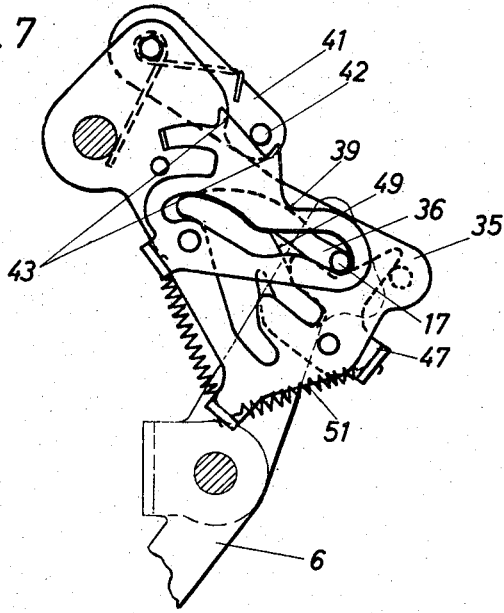
Fig. 7
INVENTORS
JOACHIM MEINHERZ
HERMANN WALDENBURGER
BY
ATTORNEY

INVENTORS
JOACHIM MEINHERZ
HERMANN WALDENBURGER

BY
ATTORNEY

Oct. 24, 1967 J. MEINHERZ ET AL 3,348,650
RIBBON FEED MECHANISM FOR TYPEWRITERS, COMPUTERS, AND
SIMILAR MACHINES
Filed July 3, 1962 6 Sheets-Sheet 6

INVENTORS
JOACHIM MEINHERZ
HERMANN WALDENBURGER
BY Percy P. Lansky
ATTORNEY

United States Patent Office 3,348,650
Patented Oct. 24, 1967

3,348,650
RIBBON FEED MECHANISM FOR TYPEWRITERS, COMPUTERS, AND SIMILAR MACHINES
Joachim Meinherz, Paderborn, and Hermann Waldenburger, Pforzen, Germany, assignors, by mesne assignments, to Societe de Mecanographie Japy, Paris, France
Filed July 3, 1962, Ser. No. 210,871
Claims priority, application Germany, Aug. 12, 1961, A 38,120
13 Claims. (Cl. 197—151)

It is the object of the present invention to provide an ink-ribbon feed, in particular carbon-paper ribbon feed mechanism for typewriters, computers, and similar machines, with the aid of which the ink ribbon is not only fed in the longitudinal direction, but can also be moved in the cross direction.

A ribbon feed mechanism has already been proposed in which the ink ribbon is lifted to various height positions, during the successive printing steps, from a normal position into which it drops back after each step is completed. This is effected with the aid of an eccentric disk which is driven by the carriage, and changes the leverage of a lever lying between the ink-ribbon fork and the ink-ribbon lifting rod. The consecutive points on the ribbon which are struck by the type-symbols are longitudinally and vertically displaced relative to each other so that they define a repetitive wavy pattern running longitudinally along the ribbon. This wavy pattern leaves a considerable amount of unused surface area on the ribbon; that is, surface area which is not struck by any of the type-symbols. Furthermore, the heretofore known drive means, which have operated from the paper carriage, have been relatively complex and expensive.

It is one object of the present invention to avoid these disadvantages, and to provide a simple arrangement with the aid of which the ribbon surface area is utilized as completely as possible in the course of one complete unwinding of the ribbon as it unwinds from one spool and onto another spool. The objects of this invention are mainly realized through the provision of connecting elements which are actuated by a universal bar, these connecting elements serving, each time a type lever is actuated, to lift a ribbon-carrying fork from a normal position in which the printed typing on the paper is visible, to either of various transversely displaced positions in accordance with a repeating cycle of transverse positions. Each transversely displaced position is displaced from the preceding position by a distance approximately equal to the height of a type-symbol. The connecting elements are in turn correlated with a feed mechanism, which moves the ribbon longitudinally, so that the longitudinal feed for each printing step only amounts to a fraction of one type-symbol width.

With this arrangement, for a complete unwinding of the ribbon from one spool onto the other, the type-symbol images will have been distributed as closely as possible over the entire ribbon surface, that is, with a minimum of unused ribbon surface remaining. Specifically, the images will be distributed in two or more straight longitudinal rows but with the vertically adjacent images being staggered relative to each other. Especially in the case of carbon-paper ribbons, e.g. ink ribbons consisting of a plastic ribbon carrying a carbon layer, there will result the advantage that also in cases where broad carbon-paper ribbons are used, an arrangement for feeding the ribbon in constant steps, in the same way as with the conventional types of carbon-paper ribbon feed mechanisms for narrow ribbons, is only required for one direction. On account of this it is possible that the width of the carbon-paper ribbon may be adapted to the width of the customary textile ribbon, so that carbon-paper and textile ribbons may be used at will in the same guiding arrangements.

The present arrangement, which provides typing along several rows instead of only one row, permits the ribbon to be correspondingly shorter in length while still providing the same number of typing images as an arrangement in which the ribbon is typed along a single row. This means that the ribbon spool may be smaller in diameter, and instead of being mounted vertically (as heretofore) may be mounted horizontally in the machine. This eliminates the need for additional spool housings as well as for spool reversing mechanisms which have heretofore been provided at the sides of the machine. Furthermore, the spool may be more easily replaced than heretofore. The carbon paper ribbon spool may be mounted at the same location as where the textile ribbon type spool is seated. Both types of spools may be designed to be directly interchangeable with each other.

As already mentioned, the arrangement according to the invention provides a better utilization of the surface of the carbon-paper ribbon. When using a ribbon having a width of 13 mm. (about half an inch), and with respect to the normal type of carbon-paper ribbon having a width of 8 mm. where two rows of the ribbon are utilized, there will result a saving of carbon paper of about 18 percent, and in cases where three rows of the ribbon are utilized, there will even result a saving of about 45 percent.

Preferred embodiments of the invention will be described in detail with reference to the accompanying drawings in which:

FIGURE 1 is a perspective view showing the device of this invention as it is arranged with various working parts of a typewriting machine, FIGURE 2 shows a portion of ribbon and schematically shows represented thereon the distribution of type images when typing is effected in only two rows.

Figure 8:
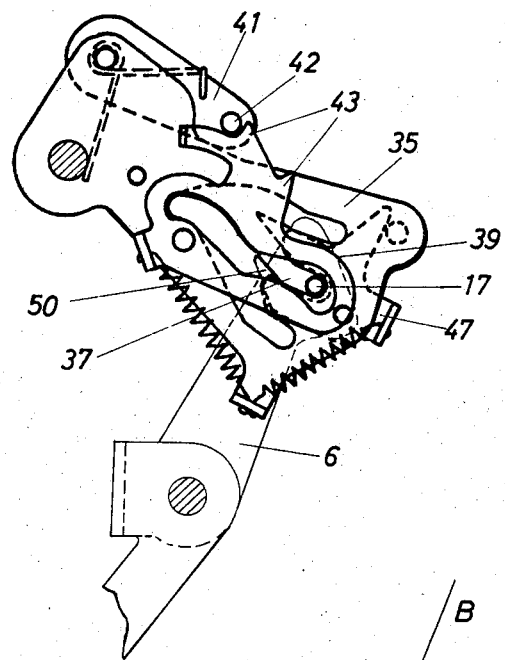
Figure 10:
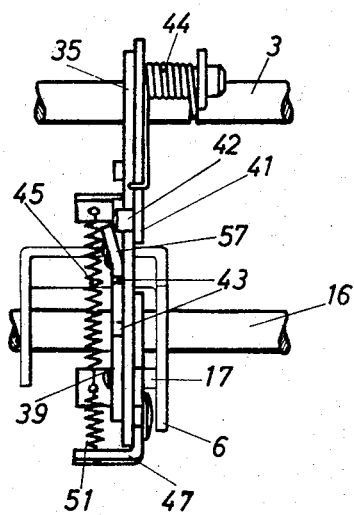
Figure 9:
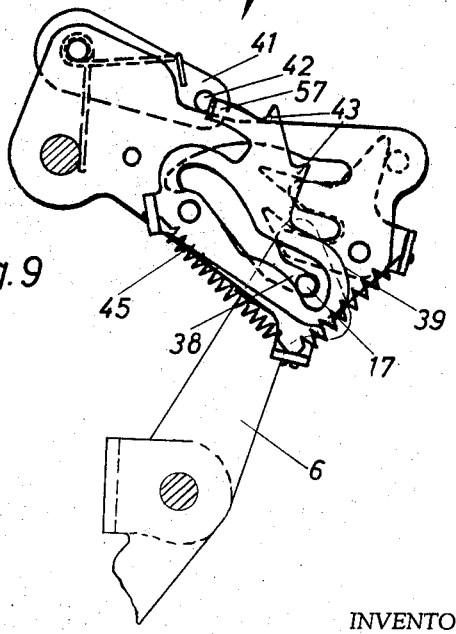
Figure 11:
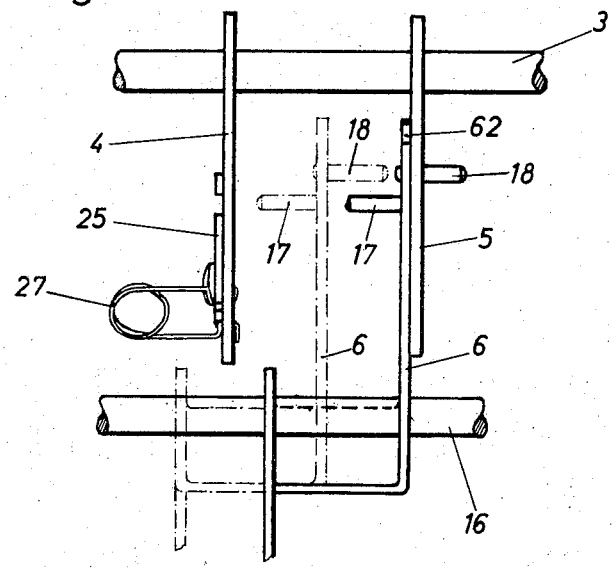
Figure 12:
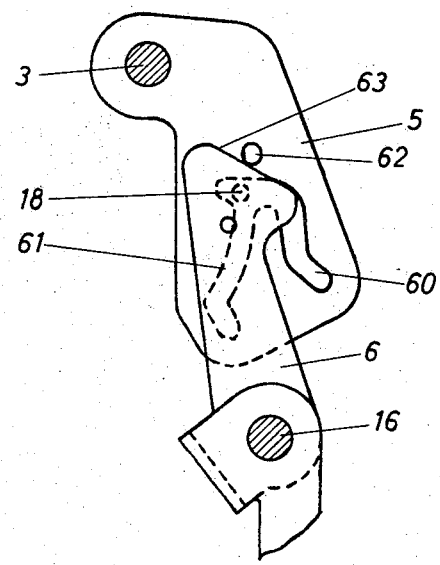
Figure 13:
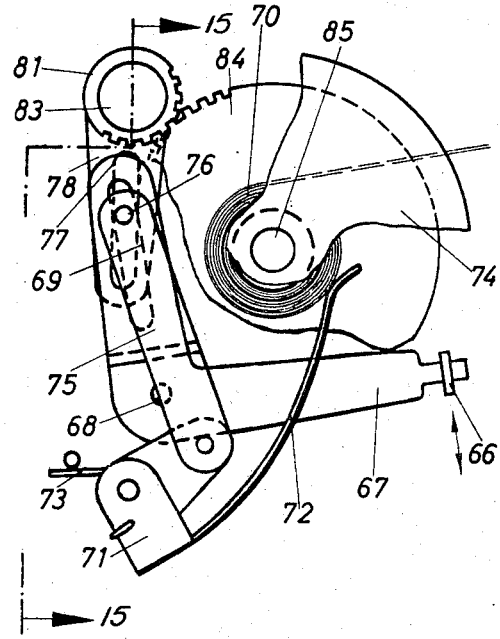
Figure 15:
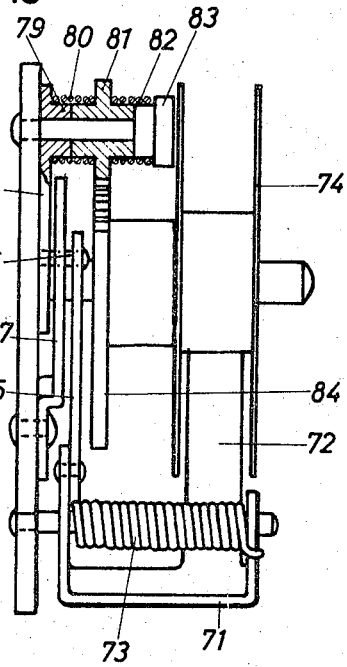
Figure 14:
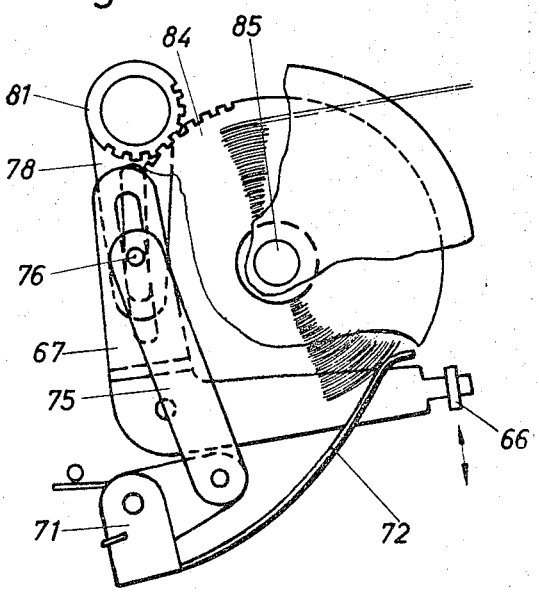

FIGURE 3 is an enlarged side elevational view of a control camplate of the present invention which provides two rows of typing on the ribbon, FIGURE 4 shows the camplate of FIGURE 3 as it appears after having moved from its position of FIGURE 3, FIGURE 5 shows a portion of ribbon and schematically shows represented thereon the distribution of type images when typing is effected in three rows, FIGURE 6 is a view of a control camplate which provides three rows of typing on the ribbon, FIGURES 7–9 show the camplate of FIGURE 6 in various successive operational positions, FIGURE 10 is a view of the apparatus of FIGURE 9 as seen in the direction of the arrow B in FIGURE 9, FIGURE 11 is a front elevational view (relative to FIGURE 3) of the lift control means of FIGURE 1, FIGURE 12 is a side elevational view showing a control camplate which is used for effecting black/red printing, FIGURE 13 is a top view of the ribbon feed mechanism as seen in the direction of arrow A in FIGURE 1, FIGURE 14 is a view similar to FIGURE 13 but showing the parts in a successive operating position, and FIGURE 15 is a sectional view taken along line 15—15 of FIGURE 13.

As is seen in FIGURE 1, a ribbon 14 passes through lateral guide slots in a guide fork 1 which can be moved vertically to position the ribbon 14 at any one of various height or lift positions. The fork 1 is vertically moved in response to a type key on the typewriter keyboard being depressed by the typist. This occurs as follows. Depression of the type key causes the cam lever 11 to engage the continuously rotating driving shaft 10 whereby the intermediate lever 12 is caused to pivot about its pivot axis. This results in lever 12 pushing the universal bar 8 which is connected at one end thereof to lever 9. Lever 9 in turn is pivoted (clockwise as seen in FIGURE 1) and it acts through link 7 to pivot driving lever 6 (also clockwise) about pivot shaft 16. Lever 6 has pins 17 and 18 extending axially from opposite sides thereof and these pins are respectively engageable in slots formed in camplates 4 and 5 which in turn are fixedly mounted on rotatable shaft 3. At one end of shaft 3 is fixedly mounted fork lever 2 which acts against a bottom portion of guide fork 1. Therefore, when either of the camplates 4 or 5 is rotated clockwise through the action of elements 6, 7, 9, 8, 12, and 11, the shaft 3 and lever 2 are rotated counterclockwise so that the guide fork 1 is lifted. Upon the return of intermediate lever 12 to its neutral position, it ceases to act upon universal bar 8 and spring 13 pulls lever 9 and its associated elements back to normal position whereby fork guide 1 (under action of the aforementioned elements as well as by its own weight) falls to its normal or lowest position, thereby exposing the printed symbols to the typist's view.

The shaft 16 on which the lever 6 is seated, is arranged in an axially displaceable manner, so that the lever 6 with a bolt 17 may engage the camplate 4 and, subsequently to the displacement, may engage the camplate 5 with its bolt 18. For the purpose of cutting wax stencils, i.e. in cases where no ink-ribbon is required, the lever 6 may be shifted to a midway position between the two camplates (as shown by the dashlines in FIG. 11), for deactivating the ribbon lift. The displacement of the shaft 16 is effected with the aid of a rail or bar 19 which is capable of being shifted in the conventional manner by a not shown handle, and which is provided with an inclined portion 20 extending in the direction of the displacement, and against which portion the one end of the shaft 16 is pressed by the spring 21. Engaging portions 22, in cooperation with a spring 93, serve to arrest the rail or bar 19 in its respective positions.

The camplate 4 is adapted to control the ink ribbon 14 in such a way that, unlike the conventional one-row ribbon utilization, two rows of the ink ribbon may now be utilized, in order to achieve a better surface utilization in the course of one passage of the ribbon, especially when using carbon-paper ribbons. To this end it is necessary that the ribbon guide is alternately lifted into two different lift positions. On account of this there will result a printing pattern as shown in FIGURE 2. The ink ribbon is fed in the longitudinal direction upon actuation of each key a distance equal to half the width of one character, so that twice as many typing strokes are executable for one complete pass (that is, one complete unwinding of the ribbon spool) of the ribbon, as compared to single row typing wherein the ribbon feed equals the full width of a character each time a key is actuated.

The control camplate 4 is provided with a cam surface comprising two profiled slots 23 and 24. As is best seen in FIGURE 4, the slot 23 is the upper slot and extends generally horizontally while slot 24 extends generally vertically, with both slots meeting each other generally at one end of each one thereof. Mounted against the outer face of camplate 4, and in face-to-face relationship therewith, is a tumbler pawl 25 which is pivoted on pin 26 which in turn is mounted on and extends axially from one face of camplate 4. Pawl 25 is laterally shiftable on pin 26 since it constitutes an oblong hole 32 by means of which it is pivotally mounted on pin 26.

Pawl 25 can be said to have a pear-shaped profile since it comprises a relatively narrow tapering arm 28 extending from a wide base portion which comprises the oblong slot 32 (as seen in FIGURES 3 and 4). The pawl 25 is pivotable between two positions about pin 26. The first position is shown in FIGURE 3 and is defined by arm 28 abutting against stop pin 30. The second position is shown in FIGURE 4 and is defined by arm 28 abutting against stop pin 29. Pins 29 and 30 are rigidly mounted in plate 4.

In the first position, as shown in FIGURE 3, the upper cam slot 23 is above the pawl 25 so that pin 17 is free to slide along slot 23 while the lower cam slot 24 is intersected by pawl 25 so that the pin 17 is blocked from entering slot 24 by pawl arm 28. In the second position, as shown in FIGURE 4, the pawl arm 28 has swung clockwise away from slot 24 so that arm 28 now intersects the slot 23 while it no longer intersects the slot 24. Pawl 25 is urged to remain in either position by action of spiral spring 27 (see FIGURE 11), which acts to "tumble" the pawl 25 into either of said positions once the pawl has already pivoted a certain amount towards any one of said positions. This tumbling action is aided by the oblong shape of slot 32.

The lifting device operates as follows. Assume the elements are as shown in FIGURE 3 and that the typist depresses a key on the typewriter key board; this will cause lever 6 to pivot clockwise whereupon pin 17 will slide along in slot 23 and thereby pivot camplate 4 counterclockwise, which results in fork guide 1 being lifted to its first (lowest) typing position which corresponds to the upper row of characters in FIGURE 2. As the pin 17 slides downwards in slot 23, it abuts and urges against upper inclined edge 31 on pawl 25 and causes pawl 25 to shift laterally downward relative to pin 26 and to pivot clockwise about pin 26 and to thereby twist spring 27 counterclockwise from its position of FIGURE 3 to that of FIGURE 4. When the pawl 25 has shifted and pivoted to the position of FIGURE 4, the spring 27, which is exerting an increasing clockwise torque on pawl 25, finally jumps or tumbles the pawl into its second position, that is with arm 28 abutting against limit stop 29. When the typing stroke is completed and pin 17 slides backwards along slot 23 to its original position as in FIGURE 3, pawl 25 yields by pivoting counterclockwise just enough to let pin 17 pass but it does not tumble back to limit stop 30.

When the typist depresses another key and thereby causes lever 6 to pivot a second time, pin 17 will be blocked from entering slot 23 and will therefore slide along in slot 24 which is unobstructed, as is seen in FIGURE 4. Thereupon, camplate 4 will again be pivoted counterclockwise under urging of pin 17; however, the downward slope of slot 24 being much greater than that of slot 23, the camplate 4 will be pivoted to a correspondingly greater degree than when pin 17 was sliding in upper slot 23, and the result of this is that the fork guide 1 is lifted to an even higher lift position than the first time, in other words, a position corresponding to the lower set of characters in FIGURE 2. Meanwhile, the ink ribbon has been fed longitudinally a distance equal to half the width of a character. Therefore, the characters in the lower row will be staggered by half a width relative to the characters in the upper row (FIGURE 2).

The pawl 25 is also tumbled as a result of pin 17 sliding along in slot 24 analogously to the tumbling action which was described with reference to the pin sliding along in slot 23. Pin 17 abuts and urges against lower surface 31 of pawl 25 and in cooperation with spring 27 causes pawl 25 to tumble back to its position as shown in FIGURE 3. Again, pin 17 slides backwards along slot 24 by simply pushing pawl arm 28 aside without, however, changing the tumbled position of pawl 25 with its arm 28 against limit stop 30.

In the course of the next striking of a type bar, the bolt 17 again enters the section 23 of the camplate 4, for controlling the next type-printing operation in the top row of the ink ribbon, according to FIG. 2. In this way two rows of the ink ribbon are used in performing the printing in a step-by-step manner.

In accordance with a further embodiment of the invention, the printing may also extend over three rows of the ribbon, as is shown in FIG. 5. The embodiment for realizing triple row typing on the ink ribbon is shown in FIGURES 6–10. Instead of the camplate 4, a camplate 35 (FIG. 6) is mounted on the shaft 3. This camplate is likewise driven or operated by the action of the bolt 17 associated with the lever 6. This camplate comprises a camming surface which includes three cam slots 36, 37, and 38, all of which radiate from a common source. On camplate 35 there is pivotally mounted a guiding element 39 about pivot axis 40. An arresting pawl 41 is also pivotally mounted on camplate 35, and includes an axially extending arresting pin 42 which is resiliently urged into engagement with a ratchet-like toothing 43 on the guiding camplate element 39 by means of torsion-coil spring 44 (see FIGURE 10). Arresting pawl 41 and guiding element 39 are each mounted against opposite faces of camplate 35. Pawl 41 is laterally displaceable (as seen in FIGURE 10) so as to move pin 42 out of engagement with the toothing 43.

In its initial position, guiding element 39 is pivotally biased against limit stop 46. On the same face of camplate 35 on which is mounted arresting pawl 41, there is also pivotally mounted guiding pawl 47 about pivot pin 48 which is carried by camplate 35. Guiding pawl 47 comprises two projecting fingers 49 and 50 which respectively extend between slots 36 and 37 and between slots 37 and 38. A spring 51 normally urges pawl 47 against limit stop 52.

Guiding element 39 comprises a guiding surface 53 which defines a slot within which pin 17 axially extends. Guiding element 39 serves to guide pin 17 into either of slots 36, 37, or 38 while projecting fingers 49 and 50 serve to prevent entry of pin 17 into either of any two of said slots.

This embodiment of the invention operates as follows: When the typist first depresses a key and thereby causes lever 6 to rotate clockwise, lever 6 will slide bolt 17 along surface 53 and into slot 36 of camplate 35. This movement of pin 17 into slot 36 forces camplate 35 to pivot counterclockwise (i.e., from its position of FIGURE 6 to that of FIGURE 7). This motion has been transferred to the ink-ribbon guide 1 via the shaft 3, and has caused a lifting of the ribbon guide, so that now the portion 54 (FIG. 5) of the ink ribbon is moved in front of the printing position. At the same time the guiding camplate 39, with respect to the camplate 35, has been turned in the clockwise direction about pin 40 to its second position (FIG. 7). During the motion of returning the bolt 17 to its initial position, the bolt 42 of the pawl 41 will meet against the first tooth of the engaging toothing 43. In this way the guiding camplate is restrained in its second position so that it can later guide bolt 17 into second slot 37 of camplate 35. In the meantime, the lever 6 returns to its normal position (from FIGURE 7 to FIGURE 6) and carries with it the pin 17 back to its normal starting position. In order to do this, however, pin 17 must first push tooth 49 out of the way (see FIGURE 7), and this is accomplished simply by pawl 47 pivoting counterclockwise against the tension of spring 51.

At the end of the first typing stroke, therefore, pin 17 will have returned to its starting position of FIGURE 6, at the meeting area of all three slots 36–38, but guiding element 39 will now be in its second starting position (since pin 42 prevents element 39 from swinging back), this second position being a clockwise pivotal position (FIGURE 7) relative to the first starting position (FIGURE 6). In this second starting position, the guiding surface 53 is downwardly inclined to an extent that it passes across the path of projecting finger 49 (see FIGURE 7). Therefore, when the typist presses down on a second typing key, pin 17 will slide along surface 53 until pin 17 abuts the left side of finger 49 whereupon pin 17 will be guided by finger 49 into second slot 37.

As pin 17 slides into slot 37, camplate 35 is pivoted counterclockwise to a greater extent than when pin 17 slid into first slot 36, and thereby positions the fork guide 1 so as to permit the typing character to be struck along row 55 in FIGURE 5; however, simultaneously with the counterclockwise pivoting of camplate 35, the guiding element 39 is pivoted clockwise relative to camplate 35 to a third starting position which is shown in FIGURE 8.

Upon completion of this second typing stroke, lever 6 and pin 17 simply pivot back from their positions as shown in FIGURE 8 to the starting positions shown in FIGURE 6. In order to do this, however, pin 17 must push projecting finger 50 out of its path (see FIGURE 8) and this is easily done by pin 17 pushing against the right side of finger 50 and thereby causing pawl 47 to pivot counterclockwise against the tension of spring 51. Guiding element 39 is, however, restrained in its third position of FIGURE 8 by virtue of pin 42 bearing against second tooth 43.

As is seen in FIGURE 8 with guiding element 39 in its third starting position, guiding surface 53 crosses the path of finger 50. Therefore, when the typist depresses a third typing key, pin 17 will slide downwardly along surface 53 until pin 17 abuts against the left side of finger 50, whereupon finger 50 will guide pin 17 into third slot 38 (see FIGURE 9). This movement will correspondingly pivot camplate 35 and lift fork guide 1 to such an extent that the typing character will be typed along row 56 in FIGURE 5.

Since the ink ribbon is fed or transported by one step in the longitudinal direction after each printing operation, with this step almost amounting to one third of the width of one letter or character, there will result a printing pattern on the ink ribbon as shown in FIG. 5. Accordingly, there is achieved a complete ribbon utilization during one single passage of the ribbon.

As soon as the bolt 17 reaches the end of the section 38 of the camplate, the guiding camplate 39 is swivelled to such an extent in the clockwise direction with respect to the camplate 35, that the bolt 42 of the pawl 41 will reach the end of the engaging toothing 43. Instead of being provided with a last tooth, this portion 43 is provided with a slantingly angled-off arm 57 (FIG. 10). As the bolt 17 slides back to its starting position, spring 45 will urge element 39 counterclockwise and thereby urge arm 57 to slide against the end of pin 42. This action of arm 57 against the end of pin 42 results in an axial displacement of pin 42 and pawl 41 against the force of spring 44 (see FIGURE 10). This permits guiding element 39 to pivot back freely (counterclockwise) to its first starting position of FIGURE 6. The guide fork lifting means is now in position to repeat a three stroke typing cycle as above described.

In order to enable the carbon-paper ribbon, which is guided in the described manner by the ribbon guide 1, to be replaced by a two-colour textile ink ribbon, there is required a single-row ribbon lift for lifting the ribbon into two different levels. To this end there is provided the camplate 5 comprising two camming or guide slots 60 and 61 (FIGS. 1, 12), which are engaged by the bolt 18 of the lever 6 after the shaft 16 has been axially displaced so that driving lever 6 is moved from its position adjacent to camplate 4 to a new position adjacent to camplate 5 (see FIGURE 11). A short pin 62, which cooperates with the outer profile 63 of lever 6, axially extends from camplate 5.

The slot 60 of the camplate corresponds to the black-colour print. In its initial range this slot of the camplate extends almost in accordance with the circular arc traversed by the bolt 18, when the lever 6 is rocked. If the shaft 16 is in a position in which the lever 6 is still outside the range of action of the bolt 62, but in which the bolt 18, already engages the slots in the camplate 5, then, in the course of a pivoting motion of the lever 6, the bolt 18 will slide into the slot 60 of the camplate. Thereupon the ribbon guide will be moved to a level corresponding to the black zone of the ink ribbon in front of the printing position.

If the shaft 16 is axially displaced to such an extent that the driving lever 6 is located immediately adjacent to the camplate 5, as may be taken from FIG. 11, then, in the course of a pivoting movement of the lever 6, the bolt 18 is directed into the slot 61 of the camplate by the action of the bolt 62 meeting against the surface 63, whereby the surface 63 acts through bolt 62 to pivot the camplate 5 counterclockwise so that the top of slot 61 is placed in the path of pin 18. This slot of the camplate corresponds to the red-colour print. In the course of this pivoting movement the camplate 5 is pivoted to such an extent that the red zone of the ink ribbon is brought in front of the printing position by the action of the ribbon guide.

Each typing stroke requires a longitudinal feed movement of the ink ribbon in accordance with either of the respective embodiments: that of FIGURES 2–4 or that of FIGURES 5–10. In the first embodiment the longitudinal ribbon feed is equal to one-half a character width while in the second embodiment it is equal to one-third a character width, this feed being constantly maintained throughout the full length of the ribbon. This uniform continuous feeding of the ribbon is achieved by correlating a feed gear with a respective diameter of ink-ribbon spool so that the larger is the spool diameter and the smaller is the angular rotation thereof for each typing stroke.

The lever 9 carrying the universal bar 8 (FIG. 1) is connected, via a rod 64, to a bell-crank lever 66 which is seated on a pivot shaft 65, and which is adapted to be engaged, at the second lever arm, by a second bell-crank lever 67 (FIGURE 13) which lever is capable of being swivelled about a pivot 68, and is provided with an oblong slot 69 extending longitudinally along one leg of said lever 67.

A sensing lever 71 which, with its arm 72, and by the action of a torsion spring 73, is pressed upon the periphery 70 of the ribbon spool 74, is flexibly or hingedly connected to a coupling rod 75. The free end of the coupling rod 75 is provided with a bolt 76 which slides in the oblong hole 69 of the bell-crank lever 67, as well as in an oblong hole 77 of a feed lever 78, thus coupling both parts (67 and 78) to one another for the purpose of transferring a swivel motion from one to the other. The hub 79 (FIG. 15) of the feed lever 78 is connected to a driving toothed wheel 81 by a coil spring 80 wrapped around both the said hub and the one side part of the hub of said toothed wheel; a second coil spring 82 is wrapped around the second side part of the toothed wheel hub and the cylindrical head of a stationary bolt 83. This bolt is the shaft of the feed lever 78 and of the wheel 81 while the said head acts as a thrust bearing therefore. The two springs 80, 82 being wrapped in reverse directions, they act as a freewheel clutch permitting each time only one rotating motion in one direction between the driving toothed wheel 81 and the stationary bolt 83 as well as between the feed lever 78 and the driving toothed wheel 81.

As a matter of fact, at a rocking motion of the feed lever 78 in the clockwise direction the toothed wheel 81 is coupled or taken along by the coil spring 80, which is tightened around the hub 79 and the wheel hub, whereas the coil spring 82 is widened up and thus releases the bolt 83, i.e. the wheel 81 is set free with respect to the bolt 83. If the feed lever 78 is rocked in the counterclockwise direction, the resulting action will be vice versa. The coil spring 80, in this case, is widened up, and thus serves to set free the feed lever 78 with respect to the wheel 81, while the coil spring 82 is being tightened maintains the toothed wheel 81 against the stationary head of bolt 83.

The toothed driving wheel 81 engages a toothed wheel 84 which is arranged on the shaft of the ribbon drum, and is firmly connected therewith. A swivel motion of the feed lever 78 in the clockwise direction, will thus cause a turning of the shaft 85 of the ribbon drum (spool) which, however, will come to a standstill when the feed lever is moved back into its initial position.

The longitudinal feed of the ribbon is uniformly maintained as follows. Each time a typing stroke is effected, the universal bar 8 acts through the lever 9, link 64, and first bell-crank 66 (see FIGURE 1) to pivot second bell-crank 67 counterclockwise (with reference to FIGURE 13). This pivoting movement of crank 67 is transferred through pin 76 to the feed lever 78 which in turn causes rotation of gears 81 and 84.

When the ribbon is first put into use, it forms a large diameter spool and the arm 72 holds sensing lever 71 at its extreme clockwise position. In this position, arm 75 supports pin 76 at its lowermost position relative to the length of the oblong slot 69 in crank 67 and also relative to the corresponding oblong slot in feed lever 78 (with reference to FIGURE 13). Therefore, for a certain angular pivoting of crank 67, there is a corresponding angular rotation of lever 78.

As the ribbon diameter progressively decreases it is necessary to correspondingly increase the angular rotation of feed lever 78 in order to maintain a constant longitudinal feed of the ribbon. Keeping in mind that the crank 67 always pivots a certain fixed angular extent regardless of the diameter of the ribbon spool, the constant longitudinal feed is effected as follows.

As the spool diameter decreases, arm 72 moves closer to shaft 85 and thereby sensing lever 71 progressively pivots counterclockwise. As lever 71 pivots counterclockwise, is moves arm 75 and pin 76 upwards along slot 69 and along the corresponding slot in feed lever 78. Therefore, as the spool diameter decreases, pin 76 moves upwards (in FIGURE 13) and this produces the two results that the distance or lever arm between pivot 68 and pin 76 increases while the distance or lever arm between pin 76 and bolt 83 decreases. This lengthening of the driving lever arm (68–76) and this shortening of the driven lever arm (76–83) means that the angular rotation of the driven lever 78 will be increased although the angular rotation of the driving lever 67 remains constant. It, therefore, results that as the ribbon spool becomes smaller and smaller, there is an automatic adjustment of the angular rotation of the feed lever 78 so that the longitudinal feed of the ribbon remains constant from beginning to end of the ribbon.

The gear elements 81, 84 are proportioned so that the longitudinal feed will correspond to either one-half or one-third a character width, depending on choice.

The arrangement as described hereinbefore, is not only adapted to the use of carbon-paper or carbon-plastic-paper ribbons, but also to the use of textile ink ribbons. Both types of ribbons can be used alternatively in an advantageous manner. In cases where a textile ink ribbon is supposed to be used there will have to be provided a similar type of ribbon feed arrangement for the rewind direction, i.e. for the other side of the typewriting machine, which is actuated by one of the conventional types of ribbon reversing devices, after the previously effective ribbon feed device has been disconnected or switched off.

While we have described above the principles of our invention in connection with specific apparatus, it is to be clearly understood that this description is made only by way of example and not as a limitation to the scope of our invention as set forth in the objects thereof and in the accompanying claims.

What we claim is:

1. In a ribbon feed mechanism for a typewriter and similar machines comprising means for stepwise longitudinal displacement of the ribbon, a ribbon guide transversely shiftable with respect to the typewriter carriage, a universal bar and lever linkage means actuated by said bar for shifting said ribbon guide, a first lever and a bolt parallel to the pivot axis of said first lever and carried thereby; a second lever pivotally carried in parallel relationship with respect to said first lever and having at least two cam slots facing said first lever, said slots converging towards the pivot axis of said second lever and cooperating with said bolt; a pear-shaped tumbler pawl pivotally carried by said second lever between said slots, said pawl having an arm directed towards the pivot axis of said second lever and the swelling portion of said pawl protruding alternately over the said slots for cooperation with said bolt; said swelling portion of said pawl having an oblong pivot hole pivotally mounting said pawl on a fixed pivot pin which is mounted on said second lever, a limit stop for said arm on either side of both said slots; a tilting spring for urging alternately said pawl against one of said stops and for tilting the same from one stop to the other; and a linked connection of said second lever with said ribbon guide.

2. In a ribbon feed mechanism for a typewriter and similar machines comprising means for stepwise longitudinal displacement of the ribbon, a ribbon guide transversely shiftable with respect to the typewriter carriage, a universal bar and lever linkage means actuated by said bar for shifting said ribbon guide, the combination of a first lever; a linked connection of said first lever with said universal bar; a bolt parallel to the pivot axis of said first lever and carried thereby; a second lever pivotally carried in parallel relationship with respect to said first lever and having at least three cam slots, substantially radially converging towards the pivot axis of said second lever, for cooperation with said bolt; a first cam element pivotally carried by said second lever, having an elongated hole for stepwise superimposition with said slots and cooperation with said bolt, said cam element being further provided with a number of ratchet notches equal to the number of said slots, said notches being arranged in an arcuate path around the pivot of said cam element and said notches terminating at one end thereof in a laterally inclined surface; a limit stop carried by said second lever; spring return means for urging said first cam element against said limit stop; a spring urged pawl pivotally carried by said second lever for cooperation with said ratchet notches and laterally rockable when cooperating with said inclined surface, for escaping from said notches; further spring urged pawl means for blocking the bolt along the path obtained by superimposition of said elongated hole and one of said slots in the direction away from the pivot axis of said second lever and for resiliently urging said bolt in the reverse direction; and a linked connection of said second lever with said ribbon guide.

3. In a typewriter and similar machines for printing graphic characters, a ribbon feed mechanism comprising means for step-wise longitudinal displacement of the ribbon, a ribbon guide transversely shiftable with respect to the longitudinal displacement of said ribbon, a universal bar and lever linkage means actuated by said bar for transversely shifting said guide, a pivoted driving lever connected to said bar through said lever linkage means, a pin extending laterally from said driving lever, a control camplate pivotally mounted parallel to said driving lever and in face-to-face relationship therewith, said camplate having at least two profiled slots converging and interconnecting at one end thereof, said slots interconnecting at a point closest to the pivot axis of said camplate and extending in a plane perpendicular to said pivot axis, said driving lever pin alternately sliding in either of said slots, a guiding element pivotally mounted on said camplate between respective guiding positions in which said element provides a path to respective ones of said slots, returning spring means pivotally urging said element into said respective guiding positions, and means connecting said camplate to said ribbon guide whereby pivotal movement of said camplate causes transverse movement of said guide.

4. A ribbon feed mechanism according to claim 3 wherein cooperation of said pin with two successive of said slots provides a difference in shift of the ribbon substantially equal to the height of a graphic sign and wherein the width of the ribbon is substantially equal to said height multiplied by the number of said slots.

5. A ribbon feed mechanism according to claim 3 wherein said camplate comprises three of said slots and wherein cooperation of said pin with two successive said slots provides a difference in shift of the ribbon substantially equal to the height of a graphic sign and wherein the width of the ribbon is substantially equal to three times said height and said ribbon feed mechanism comprising means for limiting the stepwise displacement of the ribbon to one-third of the width of graphic sign.

6. A ribbon feed mechanism according to claim 1 wherein the respective pivots of said first and said second levers are two parallel shafts, one of which is longitudinally shiftable, wherein an end of said first lever comprises a slanting portion and further comprising a second bolt parallel to said shafts protruding laterally on said first lever in opposite direction with respect to said first mentioned bolt; a third lever facing said second bolt, said third lever having two groove sections diverging substantially from the shaft carrying said second lever, one of said sections having an initial portion substantially coincident with a portion of the circular path of said second bolt when said first lever pivots, and the second section being radially directed with respect to said circular path; a pin shorter than said second bolt carried by said third lever for cooperation with said slanting portion of said first lever for urging said second bolt into said second section; and means for selectively engaging the first mentioned bolt into the groove sections of said second lever, the second bolt into the two groove sections of said third lever.

7. In a ribbon feed mechanism according to claim 3, wherein said ribbon is wrapped on a spool stepwise rotated by a lever linkage actuated by the said universal bar, the combination of a toothed wheel coaxially arranged with said spool and rotatably secured therewith; a stationary shaft parallel to the common axis of said spool and wheel; a pinion rotatably carried by said shaft and meshing with said toothed wheel; a first freewheel means allowing rotation of said pinion in one direction only with respect to said shaft; a lever pivotally carried by said shaft, said lever having an elongated aperture radially directed with respect to said shaft; further freewheel means for connecting said lever and said pinion in the direction of possible rotation of the later; a sensing lever contacting said wrapped ribbon; a pivot parallel to said shaft for carrying said sensing lever; a link pivotally carried by said sensing lever; a bolt parallel to said shaft carried by said link and engaging said elongated aperture; and a linkage lever pivotally carried in parallel relationship to said pinion and having a further elongated aperture radially directed with respect to said pivot and engaged by said bolt.

8. In a ribbon feed mechanism for a typewriter and similar machines comprising spools carrying a ribbon in wrapped condition, a ribbon guide stepwise transversely shiftable with respect to the typewriter carriage and a universal bar for controlling said feed mechanism, the combination of a toothed wheel coaxially arranged with one of said ribbon carrying spools and rotatably secured therewith a stationary shaft parallel to the common axis of said spool and wheel; a pinion rotatably carried by said shaft and meshing with said toothed wheel; first freewheel means for allowing rotation of said pinion in one direction only with respect to said shaft; a lever pivotally carried by said shaft and having an elongated aperture radially directed with respect to said shaft; further freewheel means for connecting said lever and said pinion in the direction of possible rotation of the latter; a sensing lever contacting said wrapped ribbon; a pivot parallel to said shaft for carrying said sensing lever; a link pivotally carried by said sensing lever; a bolt parallel to said shaft carried by said link and engaging said elongated aperture; a linkage lever pivotally carried in parallel relationship to said pinion and having a further elongated aperture radially directed with respect to said pivot and engaged by said bolt; and further linkage means for connecting said linkage lever to said universal bar.

9. A ribbon feed mechanism according to claim 8, wherein said pinion comprises a cylindrical hub protruding on either side thereof, said pivotal lever has a further hub of same diameter as the hub of the pinion and in contact relationship therewith and said shaft is provided with a head of the same diameter and contacting the hub of said pinion on the side remote from the side contacted by said lever hub, and wherein said first and further freewheel means comprises two reversely wound coil springs respectively wrapped the one about said head and one side of the pinion hub, the second about the other side of the pinion hub and said lever hub.

10. A typewriting machine provided with a ribbon feeding device for feeding ribbon in a longitudinal direction for each typing stroke and provided with a transverse ribbon positioning device for positioning the ribbon at either of a plurality of positions transversely of said longitudinal direction, said machine comprising: a rotatable ribbon spool for carrying a roll of ribbon, a fork guide for guiding said ribbon in a longitudinal direction and for transversely positioning said ribbon on said machine, said fork guide being transversely movable relative to said longitudinal direction, a driving means for driving the typewriter type bars, a control camplate having a plurality of interconnecting camming surfaces, said camplate being pivotable and drivingly associated with said fork guide so that pivoting of said camplate effects transverse movement of said fork guide, a pivoted control lever operatively driven by said driving means, said control lever having a portion thereof which slides along said camming surfaces, tumbler pawl means for alternately guiding said control lever portion along any one of said camming surfaces, sliding of said portion along the respective said camming surfaces causing said camplate to pivot, each of said camming surfaces corresponding to a different angular degree of pivoting of said camplate.

11. The machine of claim 10, wherein said control camplate comprises a plurality of profiled slots which constitute said camming surfaces, said slots interconnecting with each other at one end of each slot, said control lever comprising a plate in face-to-face relationship with one face of said camplate, a pin extending axially from said lever plate and into either of said slots, said pin rotating along a fixed arc when said lever is pivoted by said driving means and thereby forcing said camplate to pivot in correspondence to said arc, said tumbler pawl comprising a profiled plate member pivotally mounted on a face of said camplate opposite to said one face and about a fixed pivot pin, said pawl being pivotable about said pivot pin to any one of a plurality of pawl positions equal in number to the number of said slots, said lever pin extending beyond said opposite face of said camplate and into the same pivotal plane as said pawl, said pawl extending over said slots and covering all of said slots excepting respective ones thereof when in each of said pawl positions.

12. The machine of claim 10, wherein said tumbler pawl comprises an oblong pivot hole, said pivot pin extending through said hole, a tumbler spring connected to said pawl and to said camplate, said pawl further comprising opposed inclined surfaces which are respectively engaged by said lever pin when said pin rotates along its fixed arc, said lever pin causing said pawl to pivot in respective opposite directions when said lever pin engages respective ones of said inclined surfaces, said spring laterally displacing said pawl in the direction of said oblong hole after said pawl has been pivoted to a certain extent in either direction.

13. In a ribbon handling mechanism, the combination of, a frame, a vibrator arm rockably mounted on said frame and having a ribbon support secured thereto, a drive arm pivotally mounted on said frame, means to rock said drive arm about its pivot, and means forming a variable driving connection between said drive and vibrator arms operable to alternately move said vibrator arm from a rest position through lengths of stroke longer and shorter than a median stroke during successive cycles of operation of said drive arm, said variable driving connection comprising, a plurality of engagement surfaces on said vibrator arm responsive when engaged to drive said vibrator arm through said long and short strokes, means associated with and driven by said drive arm into engagement with an engagement surface positioned in the path thereof, and means for presenting a different engagement surface in the path of said associated means in response to each return to rest position of said vibrator arm.

References Cited

UNITED STATES PATENTS

| | | | |
|---|---|---|---|
| 536,023 | 3/1895 | Fairfield | 197—167 |
| 662,147 | 11/1900 | Gabrielson | 197—158 |
| 981,808 | 1/1911 | Steele | 197—151 |
| 990,406 | 4/1911 | Strother | 197—158 |
| 1,432,183 | 10/1922 | Hokanson | 197—157 |
| 1,807,590 | 6/1931 | Ely et al. | 197—151 |
| 1,937,048 | 11/1933 | Thompson et al. | 197—159 |

ROBERT E. PULFREY, *Primary Examiner.*

EUGENE R. CAPOZIO, *Examiner.*